United States Patent [19]

Lee

[11] Patent Number: 5,579,122
[45] Date of Patent: Nov. 26, 1996

[54] APPARATUS FOR EXTRACTING A COMPOSITE VIDEO SIGNAL OF A SELECTED CHANNEL FROM TIME DIVISIONAL MULTIPLEXED VIDEO SIGNALS

[75] Inventor: Sang-mu Lee, Suwon, Rep. of Korea

[73] Assignee: Samsung Electronics Co., Ltd., Kyungki-do, Rep. of Korea

[21] Appl. No.: 540,162

[22] Filed: Oct. 6, 1995

[30] Foreign Application Priority Data

Oct. 6, 1994 [KR] Rep. of Korea .................... 94-25567

[51] Int. Cl.⁶ ........................................ H04N 5/76
[52] U.S. Cl. ........................ 386/46; 348/385; 386/36; 386/122
[58] Field of Search ............................. 358/335, 336, 358/343, 340; 348/385–387; H04N 5/76

[56] References Cited

U.S. PATENT DOCUMENTS 5,187,589 2/1993 Kono et al. ........................... 358/335
5,444,546 8/1995 Fujimoto .............................. 358/335
5,497,244 3/1996 Chargin, Jr. et al. ................. 358/335

*Primary Examiner*—Victor R. Kostak
*Attorney, Agent, or Firm*—Sughrue, Mion, Zinn, Macpeak & Seas

[57] ABSTRACT

An apparatus for accurately extracting a selected channel of composite video signal from a time division multiplexed video signal. When a time division multiplexed video signal is reproduced from a video tape, noise may be induced due to tracking errors. To prevent noise from causing errors in demultiplexing of a given channel of composite video information from the time multiplexed video signal, a data detector (10) are provided to detect plural channel identification codes embedded in the vertical blanking period of the composite video signals. The plural detected channel identification codes are compared by comparators (60, 62) to determine if they match the channel identification code corresponding to a selected video channel. The results of the comparisons are subject to a logical OR operation (64) to determine when a composite video signal from a selected channel is to be appropriately extracted to be processed through a video signal processor (70) and for display on a monitor.

8 Claims, 2 Drawing Sheets

APPARATUS FOR EXTRACTING A COMPOSITE VIDEO SIGNAL OF A SELECTED CHANNEL FROM TIME DIVISIONAL MULTIPLEXED VIDEO SIGNALS

BACKGROUND OF THE INVENTION

1. Field of the Invention

The present invention relates to an apparatus for extracting a composite video signal of a selected channel from a time divisional multiplexed video signal, and more particularly, to an apparatus for extracting a composite video signal of a selected channel from a time divisional multiplexed video signal into which a channel identification code is inserted for identifying composite video signals of different channels.

2. Description of Related Art

Generally, a frame switcher is used for recording video signals picked up by a plurality of video cameras on a video tape through a single video cassette recorder (VCR). The frame switcher receives video signals picked up by eight cameras through eight channels and sequentially time-division-multiplexes the received video signals frame by frame, to then supply the resultant signals to a single VCR. Such a frame switcher inserts a channel identification code indicative of each channel for identifying eight channels, in a vertical blanking period of a composite video signal. The channel identification code is repeatedly loaded between 12H and 23H in the vertical blanking period. Here, "H" represents a horizontal scanning interval. A time divisional multiplexed video signal output from the frame switcher is recorded on a video tape by a VCR. An operation of a conventional frame switcher will be described below with reference to FIG. 1, when the video signal which is recorded on the video tape in the above manner is to be played back.

In the conventional frame switcher shown in FIG. 1, a channel code detector 10 detects a plurality of channel identification codes contained in a video signal played back from a video tape. Such a channel identification code is composed of three bits when eight channels are to be identified. A sync separator 20 separates a vertical sync signal VD and a horizontal sync signal HD from a playback video signal. Horizontal sync signal HD is applied to a counter 30, and vertical sync signal VD is applied to a shift register 40. Counter 30 counts horizontal sync signal HD input from sync separator 20, and supplies a channel identification code detected by channel code detector 10 to shift register 40 when the counted value becomes a value corresponding to sixteen horizontal scanning intervals. Shift register 40 is cleared by vertical sync signal VD and stores the detected channel identification code. A microcomputer 50 generates a channel identification code corresponding to a user key input signal. A comparator 60 compares the detected channel identification code stored in shift register 40 with the channel identification code output from microcomputer 50. If the compared two data values are same, comparator 60 outputs a high-level pulse signal to a video signal processor 70. Video signal processor 70 processes a playback video signal which is designated by the high-level pulse signal output from comparator 60 among the playback video signals, that is, a playback video signal of a frame having a channel identification code of a user selected channel among the playback video signals, and outputs the processed playback video signal to a monitor (not shown).

When a VCR reads out a channel identification code which has been deformed due to tracking noise, the frame switcher is also to generate a high-level pulse signal according to a deformed channel identification code. Thus, the composite video signal output from an apparatus which has been designed so that the composite video signal of the selected channel from the playback video signal based on a single channel identification code detected by the FIG. 1 apparatus is extracted, has a problem that an image of one frame is erased or an image of a non-selected channel is displayed.

SUMMARY OF THE INVENTION

Therefore, to solve the above problem, it is an object of the present invention to provide an apparatus for extracting a composite video signal of a selected channel from a time divisional multiplexed video signal based on a plurality of channel identification codes.

To accomplish the above object of the present invention, there is provided an apparatus for extracting a composite video signal of a selected channel from time divisional multiplexed video signals of at least two channels. The time divisional multiplexed video signals contain channel identification codes for uniquely identifying composite video signals as corresponding to one of the at least two channels and the channel identification codes are inserted into an identical position of the composite video signal of each channel.

The apparatus for extracting a composite video signal of a selected channel comprises:

(a) sync separation means for separating horizontal sync signals and vertical sync signals contained in the time divisional multiplexed video signal to produce separated horizontal sync signals and separated vertical sync signals;

(b) data detection means, connected to said sync separation means, for detecting at least two channel identification codes in a multiplexed composite video signal of a channel from the time divisional multiplexed video signal, based upon said separated horizontal sync signal and said separated vertical sync signal;

(c) channel identification code generation means for generating a selected channel identification code indicative of the selected channel in response to an external channel selection signal;

(d) at least two comparators, each of said at least two comparators comparing one of the at least two channel identification code detected by said data detection means with the selected channel identification code generated by the channel identification code generation means, and outputting a first binary signal according to the comparison result;

(e) an OR gate for logically summing the first binary signals output from each of said comparators and outputting a second binary signal according to the logically summed result; and (f) signal extraction means for extracting a composite video signal of a channel which is synchronized with the second binary signal from the time division multiplexed video signal as a composite video signal of a selected channel.

BRIEF DESCRIPTION OF THE DRAWINGS

The preferred embodiments are described with reference to the drawings wherein.

DETAILED DESCRIPTION OF THE PREFERRED EMBODIMENT

A preferred embodiment of the present invention will be described below in more detail with reference to the accompanying drawing FIG. 2.

Figure 1:
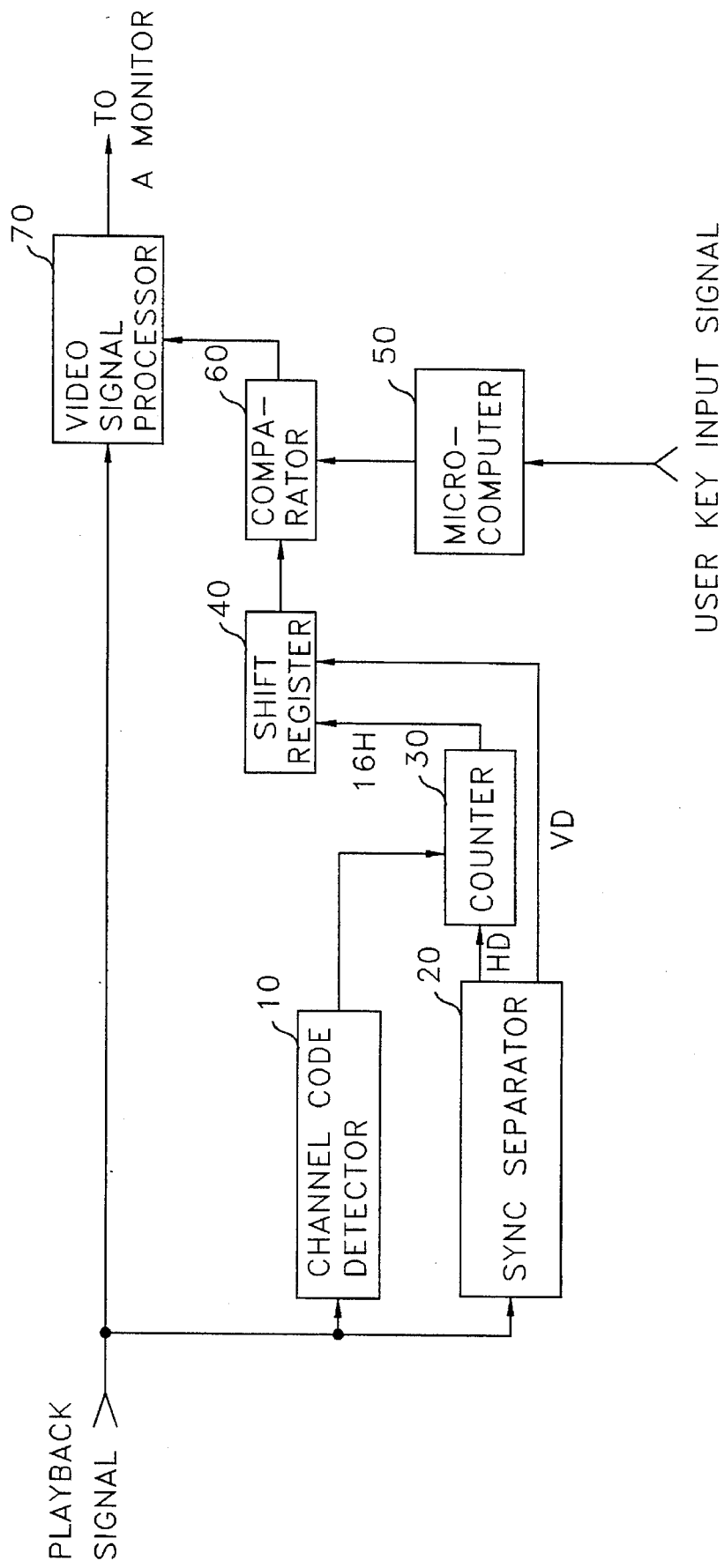
FIG. 1 is a block diagram of a conventional frame switcher.
Figure 2:
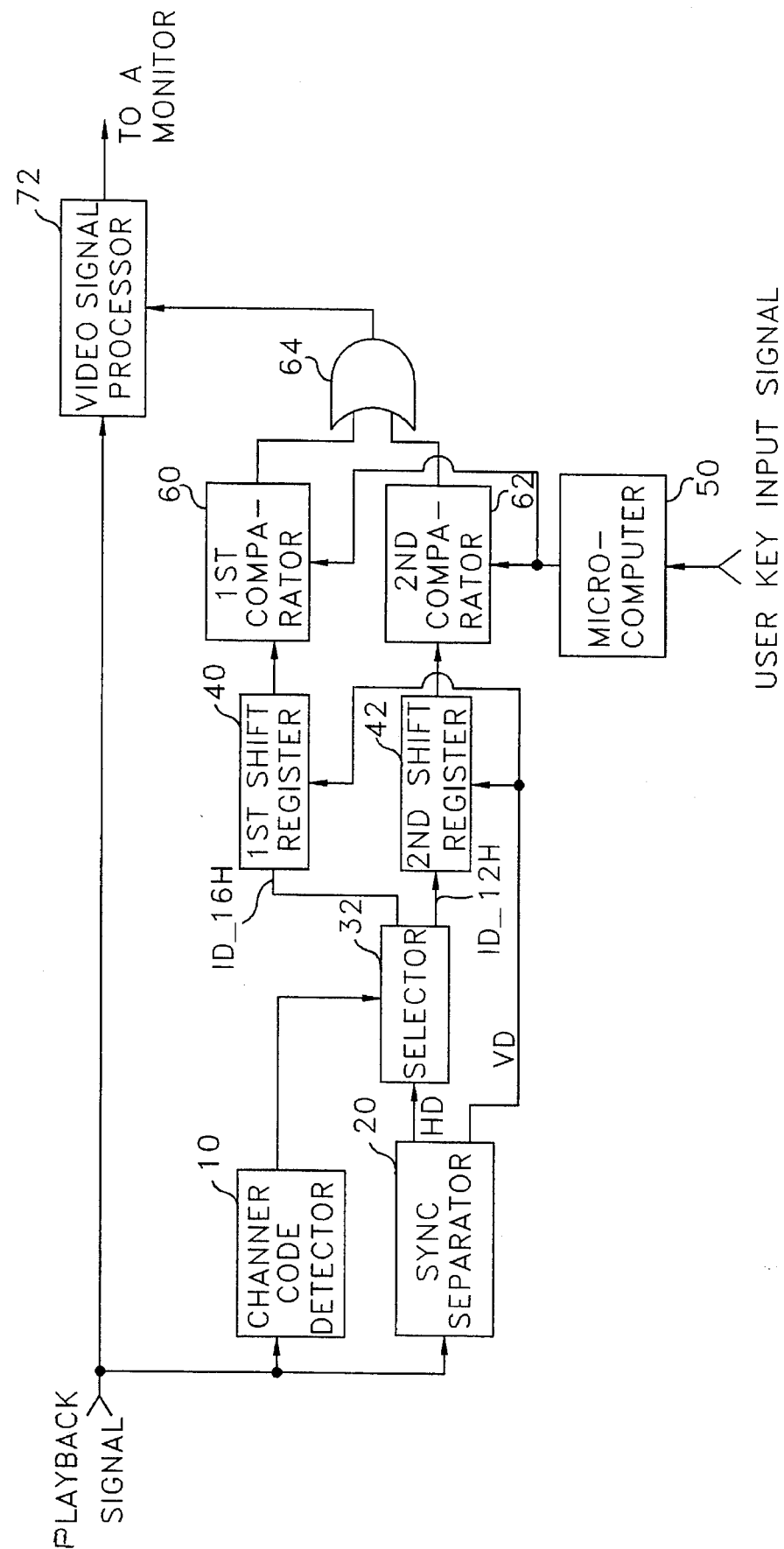
FIG. 2 is a block diagram of a frame switcher according to a preferred embodiment of the present invention.

A playback video signal which is input to a frame switcher of FIG. 2 according to a preferred embodiment of the present invention, is a signal which contains a plurality of channel identification codes in a respective vertical blanking period of composite video signals as in the FIG. 1, that is, a time divisional multiplexed video signal which has been played back from a video tape.

A channel code detector 10 and a sync separator 20 of FIG. 2 perform the same functions as those of blocks having the same reference numerals of FIG. 1. That is, channel code detector 10 receives the time divisional multiplexed video signal which is a playback video signal, and detects a plurality of channel identification codes which are loaded between 12H and 23H within each composite video signal constituting the time divisional multiplexed video signal. Sync separator 20 separates vertical sync signal VD and horizontal sync signal HD contained in each composite video signal. A selector 32 detects at least two channel identification codes which are loaded in different horizontal scanning periods of the respective composite video signals, differently from counter 30 of FIG. 1. In more detail, selector 32 counts the number of the pulses of horizontal sync signal HD applied from sync separator 20, and supplies channel identification code ID_12H to a second shift register 42 when the counted value has a value corresponding to 12H, while it supplies channel identification code ID_16H to a first shift register 40 when the counted value has a value corresponding to 16H. First and second shift registers 40 and 42 are cleared according to vertical sync signal VD output from sync separator 20, and stores corresponding channel identification codes ID_12H and ID_16H applied from selector 32, respectively. A first comparator 60 compares the data applied from a first shift register 40 with the channel identification code applied from microcomputer 50. A second comparator 62 compares the data applied from a second shift register 42 with the channel identification code applied from microcomputer 50. Here, microcomputer 50 generates a channel identification code according to a user key input signal and supplies the generated channel identification code to first and second comparators 60 and 62. First comparator 60 generates a high-level pulse signal when two compared channel identification codes are identical to each other. Second comparator 62 also generates a high-level pulse signal when two compared channel identification codes are identical to each other. The outputs of first and second comparators 60 and 62 are applied to an OR gate 64. A video signal processor 72 processes only a composite video signal of a channel corresponding to a high-level pulse signal applied from OR gate 64 among the input playback video signal, to then be supplied to a monitor (not shown).

In the above-described embodiment of the present invention, two detected channel identification codes are compared with the channel identification codes according to the user key input signals. However, considering a memory access speed, another embodiment may perform such a detection and comparison three times or more.

As described above, the composite video signal extracting apparatus according to the present invention uses a plurality of channel identification codes detected from composite video signals of the respective channels constituting a time divisional multiplexed video signal in order to extract a composite video signal of a user selected channel. Accordingly, the present invention can more accurately extract the composite video signal of the user selected channel from the playback video signal, than in the conventional apparatus even when noise is contained in the time divisional multiplexed video signal.

While only certain embodiments of the invention have been specifically described herein, it will apparent that numerous modifications may be made thereto without departing from the spirit and scope of the invention.

What is claimed is:

1. An apparatus for extracting a composite video signal of a selected channel from time divisional multiplexed video signals of at least two channels, said time divisional multiplexed video signals containing channel identification codes for uniquely identifying composite video signals as corresponding to one of the at least two channels, said channel identification codes being inserted into an identical position of the composite video signal of each channel, said apparatus for extracting comprising:

sync separation means for separating horizontal sync signals and vertical sync signals contained in the time divisional multiplexed video signal to produce separated horizontal sync signals and separated vertical sync signals;

data detection means, connected to said sync separation means, for detecting at least two channel identification codes in a multiplexed composite video signal of a channel from the time divisional multiplexed video signal, based upon said separated horizontal sync signal and said separated vertical sync signal;

channel identification code generation means for generating a selected channel identification code indicative of the selected channel in response to an external channel selection signal;

at least two comparators, each of said at least two comparators comparing one of the at least two channel identification code detected by said data detection means with the selected channel identification code generated by said channel identification code generation means and outputting a first binary signal according to the comparison result;

an OR gate for logically summing the first binary signals output from each of said comparators and outputting a second binary signal according to the logically summed result; and signal extraction means for extracting a composite video signal of a channel which is synchronized with the second binary signal from the time division multiplexed video signal as a composite video signal of a selected channel.

2. The apparatus for extracting a composite video signal according to claim 1, wherein said time divisional multiplexed video signal is a signal played back from a video tape.

3. The apparatus for extracting a composite video signal according to claim 2, wherein said data detection means comprises:

a selector, connected to said sync separation means, for counting the number of pulses of the separated horizontal sync signal and outputting at least two detected channel identification codes, each of said detected channel identification codes being selected from the time divisional multiplexed video signal at the time when the number of pulses counted by the selector has one of at least two predetermined values, and shift registers for storing the respective detected channel identification codes output from said selector and which are reset by said separated vertical sync signal.

4. The apparatus for extracting a composite video signal according to claim 2, wherein said data detection means comprises:

a channel code detector for receiving said time divisional multiplexed video signal to detect channel identification codes therein;

a selector, connected to said sync separation means and said channel code detector, for counting the number of pulses of the separated horizontal sync signal and selecting at least two detected channel identification codes from said channel code detector, each of said detected channel identification codes being detected from the time divisional multiplexed video signal at the time when the number of pulses counted by the selector has one of at least two predetermined values; and shift registers for storing the respective detected channel identification codes output from said selector and which are reset by said separated vertical sync signal.

5. An apparatus for extracting a composite video signal of a selected channel from time divisional multiplexed video signals of at least two channels, said time divisional multiplexed video signals containing channel identification codes for uniquely identifying composite video signals as corresponding to one of the at least two channels, said channel identification codes being inserted into an identical position of the composite video signal of each channel, said apparatus for extracting comprising:

sync separation means for separating horizontal sync signals and vertical sync signals contained in the time divisional multiplexed video signal to produce separated horizontal sync signals and separated vertical sync signals;

data detection means, connected to said sync separation means, for detecting at least two channel identification codes in a multiplexed composite video signal of a channel from the time divisional multiplexed video signal, based upon said separated horizontal sync signal and said separated vertical sync signal;

at least two comparators, each of said at least two comparators comparing one of the at least two channel identification code detected by said data detection means with a preselected channel identification code indicative of the selected channel, and outputting a first binary signal according to the comparison result;

an OR gate for logically summing the first binary signals output from each of said comparators and outputting a second binary signal according to the logically summed result; and signal extraction means for extracting a composite video signal of a channel which is synchronized with the second binary signal from the time division multiplexed video signal as a composite video signal of a selected channel.

6. The apparatus for extracting a composite video signal according to claim 5, wherein said time divisional multiplexed video signal is a signal played back from a video tape.

7. The apparatus for extracting a composite video signal according to claim 6, wherein said data detection means comprises:

a selector, connected to said sync separation means, for counting the number of pulses of the separated horizontal sync signal and outputting at least two detected channel identification codes, each of said detected channel identification codes being selected from the time divisional multiplexed video signal at the time when the number of pulses counted by the selector has one of at least two predetermined values, and shift registers for storing the respective detected channel identification codes output from said selector and which are reset by said separated vertical sync signal.

8. The apparatus for extracting a composite video signal according to claim 6, wherein said data detection means comprises:

a channel code detector for receiving said time divisional multiplexed video signal to detect channel identification codes therein;

a selector, connected to said sync separation means and said channel code detector, for counting the number of pulses of the separated horizontal sync signal and selecting at least two detected channel identification codes from said channel code detector, each of said detected channel identification codes being detected from the time divisional multiplexed video signal at the time when the number of pulses counted by the selector has one of at least two predetermined values; and shift registers for storing the respective detected channel identification codes output from said selector and which are reset by said separated vertical sync signal.

* * * * *